Patented Nov. 18, 1947

2,431,256

UNITED STATES PATENT OFFICE 2,431,256

PROTEINACEOUS FOAM-STABILIZING COMPOSITION AND THE PREPARATION THEREOF

Havard L. Keil, Clarendon Hills, and Joseph Sterling Ingraham, Chicago, Ill., assignors to Armour and Company, Chicago, Ill., a corporation of Illinois No Drawing. Application November 27, 1944, Serial No. 565,426

12 Claims. (Cl. 252—352)

This invention relates to a proteinaceous foam-stabilizing composition and the preparation thereof, and more particularly to the preparation of a protein hydrolysate possessing improved characteristics as a foam stabilizer.

It has been known that protein hydrolysates form very effective foam-stabilizing agents. These products strengthen the bubble films of the foam and render them more cohesive so that the foam will better adhere to a surface to which it is applied. Protein hydrolysates are particularly desirable in that they produce a foam of fine bubble structure as well as one stable to intense heat. It has also been known that by the addition of the salts of heavy polyvalent metals, such as iron, aluminum, chromium, and the like, to the protein hydrolysate, the bubble films may be further toughened and the heat resistance of the product increased. In addition, such metal salts tend to stiffen the foam. In protein hydrolysate foam stabilizers, therefore, heat resistance, fluidity of the foam, controlled stiffening of the foam, and maximum foam volume are desirable characteristics.

I have found that by drastic or relatively complete hydrolysis of proteins, a protein hydrolysate is produced which in itself does not readily foam with water. With the addition of salts of heavy polyvalent metals to such a hydrolysate, a stiff foam of relatively good volume is obtained, but the fluidity characteristics of the foam are limited. On the other hand, if the hydrolysis is mild and less complete, a protein hydrolysate is obtained which, although it readily forms a foam, does not produce as large a volume of foam as might be desired. This foam is very fluid and, in fact, cannot be modified to a sufficient extent by the addition of salts of heavy polyvalent metals to give a foam of optimum stiffness. When incorporating salts of heavy polyvalent metals in such a hydrolysate, it is found that the mixture thickens and the salt precipitates before sufficient salts are incorporated to produce the desired stiffness.

In the present invention, the protein is subjected to a mild hydrolysis and to the further step of removal of a portion of the hydrolysate which results in a product of high fluidity and capable of forming a large volume of foam. Moreover, when salts of heavy polyvalent metals are added to this hydrolysate, the foam may be readily stiffened to the desired degree. The product of the present invention, therefore, possesses most of the desirable characteristics of the protein hydrolysate resulting from mild hydrolysis while being free of the limitations and undesirable characteristics of such a product.

The present invention contemplates the hydrolysis of proteins, such as blood proteins, to the extent necessary to produce a protein hydrolysate and having a high degree of fluidity and capable of forming a fair volume of foam. This hydrolysate is further treated to remove therefrom a portion which apparently inhibits foam formation, and thus is obtained a product which possesses not only fluidity but exceptionally good foam volume and may be readily stiffened to any desired degree by the addition of salts of heavy polyvalent metals. The combination of controlled hydrolysis and removal of foam inhibitors is extremely important in the invention.

The invention may be applied to any suitable proteins, such, for example, as the histones, protamines, globins, globulins, albumins, keratins, prolamines, gluten, casein, and mucin. Blood, hoofs, horns, hide and hair furnish raw materials which are readily available commercially and are particularly suitable for the invention.

The hydrolysis may be carried out in any conventional or desired manner. Thus, the protein may be hydrolyzed with an acid, an alkali, or an enzyme. By alkali hydrolysis is meant hydrolysis with any of the conventional hydrolyzing alkalies used in protein hydrolysis. The hydrolyzing alkalies consist of the hydroxides of the alkali metals and alkaline earth metals and the oxides of the same metals. In the enzyme hydrolysis, any suitable hydrolyzing proteolytic enzyme may be used under conditions of temperature and hydrogen ion concentration favorable to the action of the enzyme. For example, pancreatin or papain may be used, with the mixture being maintained at a temperature in the neighborhood of 40° C. and at a pH of about 5 to 8. The protein may therefore be hydrolyzed with a substance of the group consisting of hydrolyzing proteolytic enzymes and hydrolyzing alkalies.

In the case of enzyme hydrolysis, when the protein material to be treated consists of blood proteins, the material should be pretreated by heating the same in an alkaline medium to destroy anti-enzymes and condition the proteins for the enzyme hydrolysis. The term alkaline medium as used herein is intended to include alkali metal and alkaline earth metal hydroxides and oxides in solution.

Although conventional acid hydrolysis with a suitable acid, such as hydrochloric or sulphuric acid, may be used, the enzyme or alkali hydrolysis is to be preferred. Acid hydrolysis normally requires very large quantities of acid and is inefficient and uneconomical by comparison with the other methods. Moreover, acid hydrolysis normally results in a product containing large quantities of water-soluble salts which may interfere with the incorporation of heavy metal salts in the final product.

The extent of hydrolysis of the proteins should be very carefully controlled. If the hydrolysis is too drastic or complete, then the product obtained is not capable of producing a good foam volume, even by further treatment and does not have the desired fluidity if metal salts are added for stiffness and to increase the foam-forming characteristics. The hydrolysis should be carried out under mild conditions. For example, in the case of alkali hydrolysis, the protein mixture may be boiled for from 1 to 8 hours in the presence of the alkali or until the vapors given off are substantially free of ammonia. Similarly, in the enzyme hydrolysis, a period of 3 to 24 hours may be used depending upon the concentration of the enzyme and conditions of the treatment.

The protein hydrolysate obtained from the alkali or enzyme hydrolysis is treated to remove therefrom a portion which apparently inhibits foam formation. This portion is believed to consist of higher molecular weight protein fragments, but regardless of its composition may be removed by precipitation by adjustment of the pH of the solution. After the hydrolysis, the hydrolysate is acidified with hydrochloric acid or with a suitable organic acid, such as acetic acid, citric acid, formic acid, tartaric acid or the like. The pH of the solution is adjusted to between 3 and 5.5, preferably to between 4.5 and 4.8. At this pH, a portion of the hydrolysate precipitates and settles from the solution. The insoluble constituents are then separated from the solution.

The hydrolysate from which a portion thereof has been removed by precipitation may be improved in its fire resistance qualities by the addition thereto of a salt of a heavy polyvalent metal. Salts of metals, such as iron, chromium, nickel, aluminum, calcium, barium, copper, lead, and arsenic, are suitable. Preferably, the metal is one which exists at more than one valence and is introduced in a compound in which it is in one of its lower valences. The sulfate has been found to be a suitable salt of the heavy polyvalent metal, although other salts, such as the chlorides and nitrates, may be used. In any event, the salt should be a water-soluble salt. The quantity of the salt of the heavy polyvalent metal which is incorporated in the mixture is preferably in the neighborhood of 1% to 4% by weight.

A specific example of the invention is as follows: 100 pounds of dry blood are dissolved in 700 pounds of water, and 7½ pounds of sodium hydroxide are stirred into the mixture. The mixture is boiled for 8 hours or until little or no ammonia can be detected in the vapor. The solution is then diluted to its original volume and 2.75 gallons of 18° Bé. muriatic acid or 2 gallons of concentrated hydrochloric acid added. This acidification produces a pH of approximately 4.8 in the mixture, and a precipitate settles from the mixture. The precipitate is removed by filtration, decantation, or the like. To the solution is then added two pounds of sodium hydroxide and the solution is concentrated by boiling until the specific gravity at 30° C. is 1.165. About 15.5 gallons of liquid solution remain at this point. Approximately 1% by weight of ferrous sulfate is then added to the solution. The pH is then adjusted to 6.8–7.0 and the product is ready for use.

If enzyme hydrolysis is to be used instead of the alkali hydrolysis, the blood mixture is treated with a small amount of alkali to destroy anti-enzymes and condition the proteins for enzyme hydrolysis and then digested from 3 to 24 hours with 1% to 4% of 1:40 pancreatin or papain. The product obtained in the invention produces a highly fluid foam of superior volume. By the addition of metal salts, the foam may be stiffened to any desired consistency. The product, therefore, possesses all of the desired properties and characteristics of a foam-stabilizing agent to a degree not heretofore found in any one product.

Although the invention has been illustrated in connection with certain specific embodiments, it will be apparent that modifications and changes may be made without departing from the spirit and scope of the invention.

We claim:

1. A process of preparing a foam-stabilizing composition, comprising subjecting a protein to hydrolysis until a foam-forming hydrolysate is obtained, discontinuing the hydrolysis, adjusting the pH of the mixture to between 3 and 5.5 to render insoluble a portion of the hydrolysate, separating the insoluble constituents from the mixture, and adding to the mixture between 1% and 4% by weight of a water-soluble salt of a heavy polyvalent metal.

2. A process of preparing a foam-stabilizing composition comprising subjecting a protein to hydrolysis until a foam-forming hydrolysate is obtained, discontinuing the hydrolysis, adjusting the pH of the mixture to between 4.5 and 4.8 to render insoluble a portion of the hydrolysate, separating the insoluble constituents from the mixture, and adding to the mixture between 1% and 4% by weight of a water-soluble salt of a heavy polyvalent metal.

3. A process of preparing a foam-stabilizing composition, comprising hydrolyzing a protein with a hydrolyzing alkali until a foam-forming hydrolysate is obtained, discontinuing the hydrolysis, adjusting the pH of the mixture to between 3 and 5.5 to render insoluble a portion of the hydrolysate, separating the insoluble constituents from the mixture, and adding to the mixture between 1% and 4% by weight of a water-soluble salt of a heavy polyvalent metal.

4. A process of preparing a foam-stabilizing composition comprising hydrolyzing a protein with a hydrolyzing alkali until a foam-forming hydrolysate is obtained, discontinuing the hydrolysis, adjusting the pH of the mixture to between 4.5 and 4.8 to render insoluble a portion of the hydrolysate, separating the insoluble constituents from the mixture, and adding to the mixture a water-soluble salt of a heavy polyvalent metal in sufficient quantity to serve as a stiffener of the foam produced.

5. A process of preparing a foam-stabilizing composition comprising subjecting a protein to alkali hydrolysis until the vapors liberated from the mixture are substantially free of ammonia, discontinuing the hydrolysis, adjusting the pH of the mixture to between 4.5 and 4.8, separating the insoluble constituents from the mixture, and adding to the mixture a water-soluble iron salt in sufficient quantity to serve as a stiffener of the foam produced.

6. A process of preparing a foam-stabilizing composition comprising subjecting a blood protein to alkali hydrolysis until the vapors liberated from the mixture are substantially free of ammonia, discontinuing the hydrolysis, adjusting the pH of the mixture to between 3 and 5.5 to render insoluble a portion of the hydrolysate, separating the insoluble constituents from the mixture, and adding to the mixture a water-soluble salt of a heavy polyvalent metal in sufficient quantity to serve as a stiffener of the foam produced.

7. A process of preparing a foam-stabilizing composition comprising treating blood with a hydrolyzing proteolytic enzyme under conditions of temperature and pH favorable to the enzyme action until a foam-forming hydrolysate is obtained, discontinuing the hydrolysis, adjusting the pH of the mixture to between 3 and 5.5 to render insoluble a portion of the hydrolysate, separating the insoluble constituents from the mixture, and adding to the mixture between 1% and 4% of a water-soluble salt of a heavy polyvalent metal.

8. A process as set forth in claim 7 wherein the pH is adjusted to between 4.5 and 4.8 and the heavy metal salt which is added to the mixture is ferrous sulfate.

9. A process as set forth in claim 1 wherein the protein is a mixture of the proteins of blood.

10. In a process of preparing a foam-stabilizing composition, the steps of adjusting the pH of a foam-forming hydrolysate of a protein to between 3 and 5.5 to render insoluble a portion of the hydrolysate, separating the insoluble constituents from the hydrolysate, and adding to the hydrolysate between 1% and 4% by weight of a water-soluble salt of a heavy polyvalent metal.

11. In a process of preparing a foam-stabilizing composition, the steps of adjusting the pH of a foam-forming hydrolysate of a protein to between 4.5 and 4.8 to render insoluble a portion of the hydrolysate, separating the insoluble constituents from the mixture, and adding to the mixture a water-soluble salt of a heavy polyvalent metal in sufficient quantity to serve as a stiffener of the foam produced.

12. In a process of preparing a foam-stabilizing composition, the steps of adjusting the pH of a foam-forming hydrolysate of a protein to between 4.5 and 4.8 to render insoluble a portion of the hydrolysate, separating the insoluble constituents from the mixture, and adding to the mixture ferrous sulfate in sufficient quantity to serve as a foam-stiffener.

HAVARD L. KEIL.
JOSEPH STERLING INGRAHAM.

REFERENCES CITED

The following references are of record in the file of this patent:

UNITED STATES PATENTS

| Number | Name | Date |
| --- | --- | --- |
| 1,495,308 | Jennings | May 27, 1924 |
| 2,151,398 | Weissenborn | Mar. 21, 1939 |
| 2,158,499 | Grassman | May 16, 1939 |
| 2,212,470 | Friedrich | Aug. 20, 1940 |
| 2,324,951 | Ratzer | July 20, 1943 |
| 2,363,794 | Julian | Nov. 28, 1944 |
| 2,381,407 | Levinson | Aug. 7, 1945 |